Feb. 9, 1954

G. F. CLEMENT 2,668,551

ADJUSTABLE PIPE CLEANER

Filed April 11, 1952

INVENTOR.
George F. Clement
BY
HIS ATTORNEYS

Feb. 9, 1954
G. F. CLEMENT
2,668,551
ADJUSTABLE PIPE CLEANER
Filed April 11, 1952
2 Sheets-Sheet 2
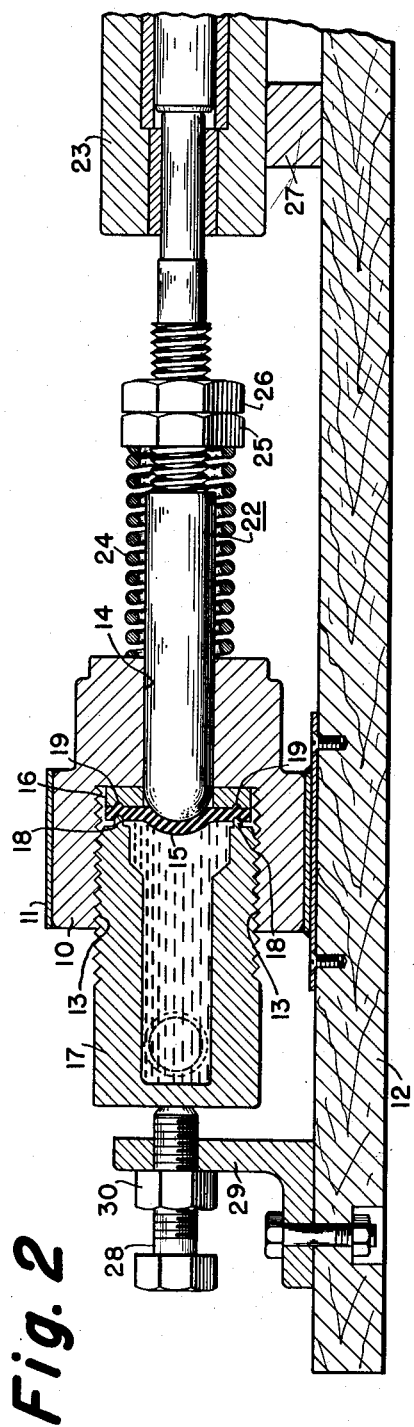
Fig. 2
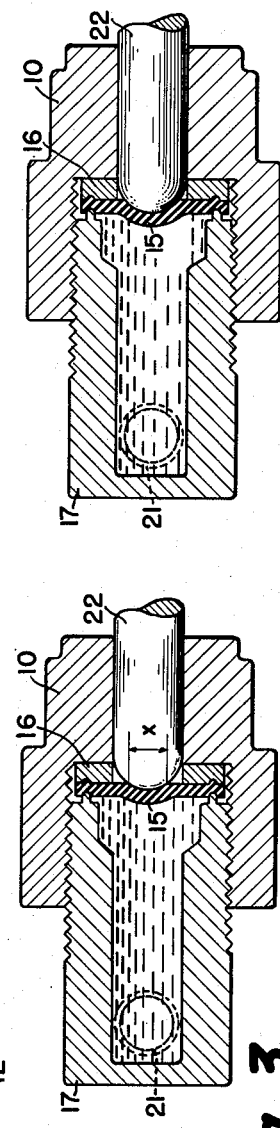
Fig. 3
Fig. 4
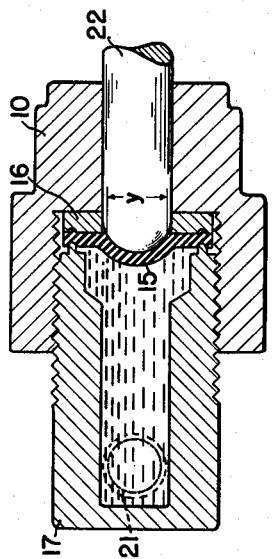
Fig. 5
INVENTOR.
George F. Clement
BY *Welt, Mackey & Burden*
HIS ATTORNEYS Patented Feb. 9, 1954

2,668,551

UNITED STATES PATENT OFFICE 2,668,551

ADJUSTABLE PIPE CLEANER

George F. Clement, Penn Township, Allegheny County, Pa.

Application April 11, 1952, Serial No. 281,865

11 Claims. (Cl. 134—169)

The present invention relates to a pipe cleaner adaptable, for example, for cleaning pipes connecting a water main to individual homes along a street, and particularly to one that is adjustable to meet varying requirements.

It has been proposed to remove rust, scale, muck and like matter, from pipes by an impact transmitted through a fluid such as water in the pipe. Heretofore, this has been accomplished by connecting a cylinder having a piston to the pipe to be cleaned and subsequently striking the piston with a heavy hammer. Such devices are effective to a degree, but they are subject to many limitations and shortcomings, primarily because of their inflexibility and substantially uncontrollable operation.

Exemplary of the problems and varying requirements met in cleaning pipes are the following. Some pipes may be so weakened by age and corrosion that even a normal impact submitted by a conventional cleaner is sufficient to burst the sides of the pipe. Or even in the case of new pipes, if the back pressure from the water main is very low as in hilly districts, the resultant force of a normal impact over the low back pressure may be sufficient again to burst the pipes. Additionally, pipes may differ widely in diameter necessitating impacts of varying force to clean out each pipe quickly and easily. Or even when pipes of a uniform diameter are cleaned, it frequently happens that each has a different effective internal diameter because of the accumulation in diverse amounts of rust, scale, and muck along the insides of the pipes, thereby presenting the same problem. Further, another cleaning problem is met when it is desired to clean long pipes, for example, when it is desired to reach the ferrule connecting a pipe to a water main. Still further, an equally serious hazard in pipe cleaning is that of clogging or "bottle necking" wherein muck, scale, and the like, are actually broken free of a pipe faster than the flow of water through the pipe can carry such matter away.

Moreover, pipe cleaners of the prior art are objectionable in that they force scale and rust from the pipe in the same direction as the flow resulting from the piston stroke, that is, toward the water main. Consequently, many water companies prohibit their use in cleaning pipes connecting a home with a street water main to prevent introduction of the scale and rust into the main.

Additionally, many cleaners cannot be operated safely without leaking and causing damage to floors and the like. This disadvantage is especially felt when the pipes to be cleaned are contained in or adjoin furnished rooms. Also, it frequently happens that a pipe becomes so clogged it completely shuts off the pressure and water from the main. In such a case, it is useless to attach a conventional cleaner to the pipe since there is no water available to fill the cleaner and transmit the hammer blows to the pipe to be cleaned.

The present invention provides a universal cleaner that is readily adjusted to meet all the mentioned problems and varying requirements in cleaning all pipes under all conditions. Further, the present cleaner is not subject to the hazards of "bottle necking" or leakage. This is accomplished in one form by a hollow cylinder adapted at one end for connection to the pipe to be cleaned. An internal diaphragm tightly seals the opening, and a piston, which preferably is subject to blows of a constant force exerted at fixed intervals, contacts the diaphragm from the other end of the cylinder.

By changing the relative positions of the hollow cylinder and the piston, the maximum penetration of the piston into the cylinder and the resultant displacement of the diaphragm can be adjusted to provide a corresponding range of pressure impacts and volume displacements of the fluid in the hollow cylinder.

Even for a given setting of the hollow cylinder and piston, the present invention provides further adjustments by using a cushion having a variable effect to absorb partially the blows rained against the piston.

The cleaner of the present invention may also be constructed to allow the rust and scale to flow back through the cleaner rather than in an opposite direction through the pipe being cleaned and into a main line. For this purpose, the end of the cylinder adapted for connection to a pipe may also have another outlet of variable size which allows the scale, rust, and muck dislodged by the action of the cleaner to flow through the pipe toward the cleaner and to leave the system through this outlet. When the pipe to be cleaned is so clogged that the pressure and water from the main line are completely shut off, this same outlet may also be used to fill the cleaner and pipe from an auxiliary source after which the cleaner may be operated as before.

The accompanying drawings illustrate a presently preferred embodiment of the invention in which—

Figure 2 is a section on the line II—II of Figure 1; and

Figures 3, 4 and 5 are sections of the cleaner corresponding to that shown in Figure 2 and illustrate displacements of the diaphragm as the positions of the cylinder and piston are changed relatively to each other.

Figure 1:
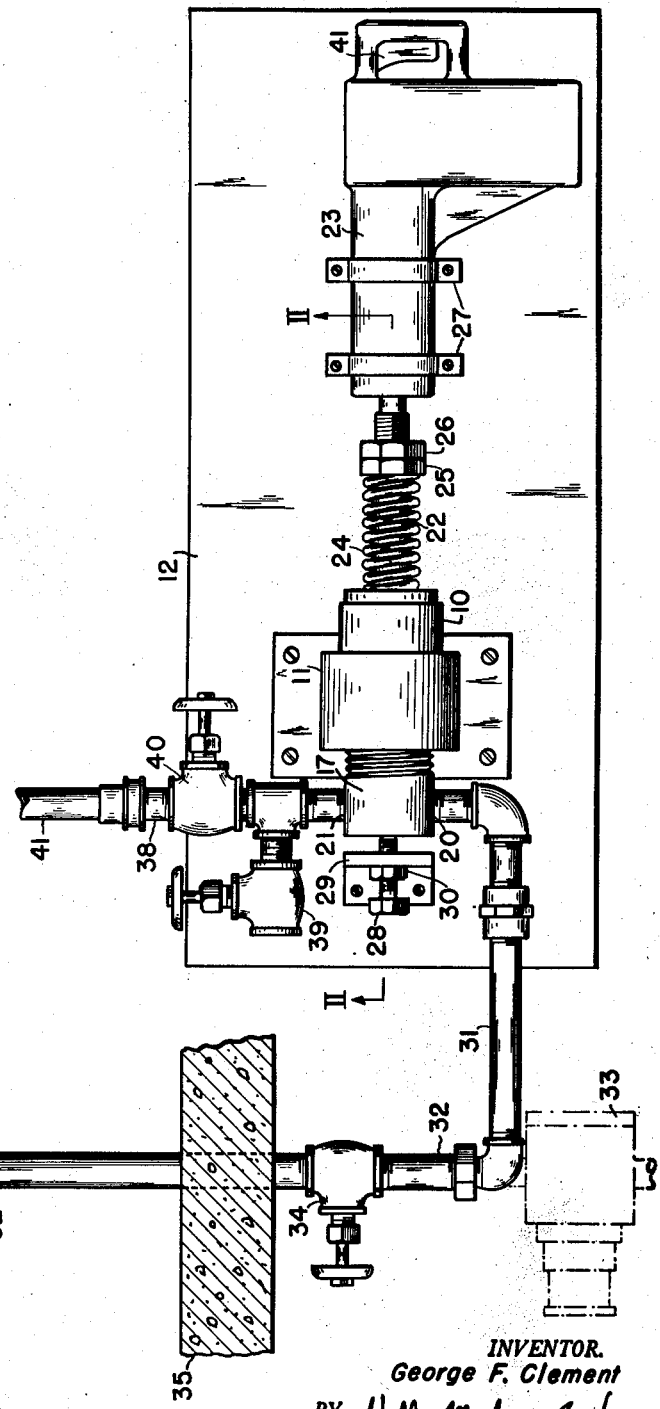
Figure 1 is a plan view of the cleaner which, with accessory equipment, is shown in combination with a pipe to be cleaned and a water main.

Referring chiefly to Figures 1 and 2, this embodiment comprises a cylindrical shell 10 adapted to slide axially in a sleeve 11. The latter is fixed to a base plate 12. The shell 10 has a relatively large threaded opening 13 at one end and an aligned, smaller, smooth opening 14 at the other. A flexible rubber diaphragm 15 covers a holding ring 16 which seats against the offset created by the unequal internal diameters. A hollow cylinder 17 screws tightly into the threaded opening 13 and bears a ring 18 against the diaphragm forcing a corresponding ring to rise on the other side of the diaphragm and to mate with an annular groove 19. The other end of the cylinder 17 has an inlet 20 and an outlet 21.

A piston 22 engages the smaller opening 14 and contacts the diaphram 15 at least during its axial movement. When the piston has a convex nose as shown, the cleaner is even more sensitive to adjustments as hereafter described. It is possible to operate the cleaner by manually hammering the end of the piston, but it is much preferable to have a constant force applied at fixed intervals to provide an action which can be accurately controlled and adjusted. For this purpose, a power hammer 23 is coupled to the free end of the piston. Such a hammer may be a fluid-actuated, automatic hammer, such as an air hammer. A preferred hammer is an electric one which by a conventional electromagnetic hammer head can deliver as many as 2200 blows per minute.

In the same manner, the back pressure of water in the pipe and the back stroke of the hammer can be used to return the piston after a forward stroke, but it is much preferable to use a compressible member to urge the return quickly. In this embodiment, that member is a coiled, compressible spring 24 which is concentric with the piston 22. The spring bears at one end on the cylindrical shell 10 and at the other against an adjusting nut 25 backed by a lock nut 26 which engage a threaded portion of the piston.

The present invention provides several adjusting features. For one, the maximum area of contact of the piston with the diaphragm can be varied by changing the relative positions of the cylindrical shell and the piston. For example, if the axial movement of the piston is contained in a fixed position as by securing the hammer 23 to the base plate 12 with clamps 27, the cylindrical shell 10 can be moved relatively to the piston by sliding the former axially in the sleeve 11. This may be done manually by clamping the shell 10 or hollow cylinder 17 at desired points; or shims of different widths may be inserted between the end of the hollow cylinder and a fixed support plate; or by still another means. A preferred way is to use a screw adjustor, because it has a finer degree of control. Such an adjustor may be a screw 28 engaging a threaded opening in an angle bar 29. The screw bears against the end of the cylinder 17 as shown, and a lock nut 30 fixes the axial position of the screw. The angle bar is suitably secured to the base plate 12.

A still finer adjustment is obtained when the piston has a convex nose contacting the diaphragm because just small changes in the relative positions of the shell and piston result in effective changes in the area of contact between the diaphragm and piston.

Another adjusting feature of the present cleaner resides in the cooperating relation of the piston with the spring 24. By placing the nuts 25 and 26 at various stations along the piston, a widely varying amount of compressive force may be stored in the spring. This compressive force then cushions the blows rained against the free end of the piston by absorbing some of that force to an extent dependent on the position of the nuts 25 and 26.

Conventional piping and fittings 31 join the inlet 20 to a pipe 32 which is to be cleaned. Generally the connection to the pipe is just before a water meter 33 which is then removed while the cleaning takes place. The pipe 32 usually contains a shut-off valve 34 and passes through a basement wall 35 to join a water main 36 through a ferrule 37. In the present embodiment, conventional piping and fittings 38 are also secured to the outlet 21. The piping, containing a drain valve 39 and a shut-off valve 40, can be connected to an auxiliary water supply such as that of a neighboring home by a hose 41.

In operation, valve 34 is open, valve 39 is initially closed or slightly open, and valve 40 is closed. After the piping 31 and cylinder 17 are filled with water, a trigger 41 of the hammer is tripped causing a rapid series of blows of constant force to be delivered against the piston at fixed intervals. The spring 24, the back pressure of the water main, the resilient rubber diaphragm 15, and the back stroke of the hammer combine to return the piston after each forward stroke. As the piston continuously strikes the diaphragm, a series of shock waves is transmitted through the cylinder and piping 31 to the pipe 32 to be cleaned. This incessant jarring breaks loose the rust, scale, and muck within the pipe 32, and, since the slightly opened valve 39 affords a release of the water pressure, the flow in the pipe is toward the cleaner and out that valve. As the cleaning progresses and water from the main 36 flows more readily through the pipe 32, the valve 39 may be opened gradually to take advantage of the flushing action afforded by the pressure of the water main.

If the pipe 32 is so clogged that the pressure and water of the main are completely shut-off, the cylinder 17 and piping 31 may be filled up to the plugged area by opening the valve 40 and allowing water to enter from the auxiliary source. Thereafter, the hammer is operated as before until the water from the main breaks through the clogged pipe. At this time the valve 40 may be closed and the cleaner operated as first described.

The same technique of using an auxiliary source of water may be used when cleaning a pipe which is not connected to a water main or other source of pressure, for example, a pipe leading from the discharge side of the meter 33 to fixtures in a home.

During any of these operations, the adjustments of the present embodiment may be used. With particular reference to the adjustment involving varying the relative positions of the cylindrical shell and piston, Figures 3 to 5, inclusive, illustrate three possible settings. By this adjustment the diaphragm is distorted as shown a varying amount. The cooperating action of the diaphragm and piston is based on the hydrostatic law that the pressure increases as the square of the diameter of the piston decreases. For example, in Figure 3, the shell 10 is moved away from the piston 22 so that the area of contact between the diaphragm 15 and the piston is relatively small and the piston has an effective diameter $x$. In this case a very high pressure is transmitted through the water in the cylinder 17 although the volume displacement, conversely, is small. At the other extreme in Figure 5, the shell 10 is moved toward the piston so that the latter has a much larger effective diameter $y$. In this instance a much lower pressure is transmitted through the cylinder although the volume displacement is high. Figure 4 represents an intermediate stage for both effects. The sensitive control provided by a piston having a convex nose is especially apparent from these figures.

The adjustments of the present cleaner may be used singly or in combination. As for some specific instances of use, to meet the requirements for cleaning pipes of various diameters, the adjusting screw 28 is moved forwardly for larger pipes and backwardly for smaller ones. This movement of the cylinder and shell causes a corresponding change in the distortion of the diaphragm which in turn increases or decreases the water displacement many times. When it is desired to clean pipes whose inside diameters differ because of varying accumulations of scale, rust, and muck, or to clean pipes without the hazard of "bottle necking," the preferred technique is to start with the adjusting screw 28 turned far back to provide a setting like that of Figure 3 wherein a very small quantity at high pressure is forced through the pipe to be cleaned. By starting out with a very small volume of water at high pressure, a very small channel is created within the pipe. Upon gradually increasing the volume of water at a lower pressure, more rust and scale are cleaned out of the pipe, and the channel for the passage of water is gradually enlarged. By repeated operations of the cleaner at greater volumes and lower pressures, the inside diameter of the pipe is restored to its full carrying capacity. Experience has also shown that a very small amount of water at high pressure can be forced through the inside core of an old corroded pipe without fear of breakage, while a larger amount at the same pressure will burst it. At the same time, the described technique dislodges muck and scale no faster than it can be carried away by the flow of the water.

If the cleaner is used in hilly districts where back pressure in the water main may be so low that bursting the pipe is apt to result, or if for other reasons even a relatively weak blow is apt to cause trouble, the adjusting nut 25 and the lock nut 26 are turned toward the shell 10 to compress the spring 24. In this condition, the spring cushions the blows on the piston by acting as a counterforce. Conversely, if the back pressure should be very great, the nuts 25 and 26 are turned away from the shell so that the full effect of the hammering carries through the system.

On the other hand, both adjustments may be used, for example, when cleaning very long lines or when it is desired to reach a ferrule connecting a line to a water main. In this case, the operator turns the adjusting screw 28 toward and the nuts 25 and 26 away from the cylinder and its shell to allow full freedom of motion of the piston. In its forward motion, then, the piston greatly distorts the diaphragm forcing a very large volume of water through the long pipe and through the ferrule. The tight seal afforded by the diaphragm 15 has been found to prevent leakage. Further, since the diaphragm separates the water in the cylinder 17 from all moving parts, the diaphragm eliminates stuffing boxes, glands, and the like used in prior cleaners.

While the foregoing disclosure describes a presently preferred embodiment, it is understood that the invention may be practiced in other forms within the scope of the following claims.

I claim:

1. A pipe cleaner comprising a base having an opening therethrough and adaptable at one end for connection to the pipe to be cleaned, a diaphragm disposed across the opening at an internal point, a rod member engageable with the other end of the opening and adapted for axial movement, means for imparting a series of blows to the rod, and adjusting means to vary the maximum degree of penetration of the rod member into the opening.

2. A pipe cleaner comprising a base having an opening therethrough, means for connecting one end of the opening to the pipe to be cleaned, a diaphragm sealing the opening internally, a piston engageable with the other end of the opening and having a protuberance on a part projecting away from the base, compressible means extending from the protuberance to the base, power means for imparting a series of blows at high frequency to the piston, and an adjustor to vary the maximum degree of penetration of the piston into the opening.

3. A water pipe cleaner comprising a hollow cylinder, a connector joining one end of the cylinder to the pipe to be cleaned, a diaphragm within the cylinder sealing the opening, a piston engageable with the other end of the cylinder and contacting the diaphragm during its axial movement, a vibrator for imparting a series of blows at high frequency to the piston and thereby to the diaphragm, and an adjustor to vary the maximum penetration of the piston into the cylinder whereby the effective area and displacement of the diaphragm can also be varied.

4. A water pipe cleaner comprising a hollow member, a connector joining one end of the member to the pipe to be cleaned, a diaphragm within the member sealing the opening, a piston engageable with the other end of the member and contacting the diaphragm during its axial movement, a protuberance on the piston spaced from said other end of the member, a compressible member stationed between the protuberance and the member, a vibrator for imparting a series of blows at high frequency to the piston and thereby to the diaphragm, and an adjustor to vary the maximum penetration of the piston into the member whereby the effective area and displacement of the diaphragm can also be varied.

5. A water pipe cleaner comprising a sleeve, a tubular member adapted to move in the sleeve, a connector joining one end of the tubular member to the pipe to be cleaned, a flexible diaphragm sealing the opening of the tubular member at an internal point, a piston engageable with the other end of the tubular member having a convex nose contacting the diaphragm during the axial movement of the piston, a vibrator for imparting a series of blows at high frequency to the end of the piston and thereby to the diaphragm, and an adjustor to position the tubular member in the sleeve whereby the maximum penetration of the piston into the tubular member and resultant effective area and displacement of the diaphragm can be varied.

6. A water pipe cleaner comprising a sleeve, a tubular member adapted to move in the sleeve and having an inlet and an outlet at one end, a connector joining the inlet to the pipe to be cleaned, a flexible diaphragm sealing the opening of the tubular member at an internal point, a piston engageable with the other end of the tubular member having a convex nose contacting the diaphragm during the axial movement of the piston, a stop on a part of the piston projecting away from the tubular member, a spring stationed between the stop and the tubular member, a vibrator for imparting a series of blows at high frequency to the end of the piston and thereby to the diaphragm, and an adjustor to position the tubular member in the sleeve whereby the maximum penetration of the piston into the tubular member and resultant effective area and displacement of the diaphragm can be varied.

7. A water pipe cleaner comprising a sleeve having a fixed position, a tubular member adapted to move axially in the sleeve and having an inlet and an outlet at one end, conduit joining the inlet to the pipe to be cleaned, conduit secured to the outlet and itself having two outlets, one of which is adapted for connection to an auxiliary water supply, a flexible diaphragm sealing the opening of the tubular member at an internal point, a piston engageable with the other end of the tubular member having a convex nose contacting the diaphragm during the axial movement of the piston, a radial stop on a part of the piston projecting away from the tubular member, a spring encircling the piston from the stop to the tubular member, automatic hammer means stationed a fixed distance from the sleeve for imparting a series of blows at high frequency to the free end of the piston and thereby to the diaphragm, and an adjustor bearing against the tubular member to place it at a desired point in the sleeve whereby the area of contact between the diaphragm and piston and the resultant displacement of the diaphragm can be varied.

8. A water pipe cleaner comprising a sleeve having a fixed position, a hollow cylinder adapted to move axially on its curved surface in the sleeve having an inlet and an outlet at one end and an opening at the other end, conduit connecting the inlet to the pipe to be cleaned, conduit secured to the outlet adapted for connection to an auxiliary water supply and containing a drain exit, a flexible diaphragm sealing the opening of the cylinder at an internal point, a piston engageable with the opening at the other end of the cylinder having a convex nose contacting the diaphragm during the axial movement of the piston, a ridge on the piston spaced from said other end of the cylinder, a coiled spring concentric with the piston and extending from the ridge to the cylinder, an automatic hammer stationed a fixed distance from the sleeve and coupled to the free end of the piston, and screw adjusting means bearing against the cylinder to move it axially to a desired point in the sleeve whereby the maximum area of contact between the diaphragm and piston and the resultant displacement of the diaphragm can be varied.

9. A cleaner for water pipes which is adjustable to meet varying requirements comprising in combination a sleeve having a fixed position; a cylindrical shell adapted to move axially on its curved surface in the sleeve, one end of the shell having a larger internal diameter than the other; a flexible diaphragm sealing the cylindrical shell substantially at the offset created by the two unequal internal diameters and fixed to the shell at that point; a hollow cylinder fixedly engaging the larger end of the shell and having an inlet and an outlet at the end projecting away from the shell; a tubular connector joining the inlet to the pipe to be cleaned; a tubular connector secured to the outlet, adapted for connection to an auxiliary water supply, and containing in series in a direction away from the cylinder a drain valve and a shut-off valve; a piston slidably engaging the smaller end of the shell having a convex nose contacting the diaphragm during the axial movement of the piston; a ridge on a part of the piston spaced from the smaller end of the shell; a coiled compression spring concentric with the piston and extending from the ridge to the shell; an electric hammer stationed a fixed distance from the sleeve and coupled to the free end of the piston; and screw adjusting means bearing against the cylinder to move it axially to a desired point in the sleeve whereby the maximum area of contact between the diaphragm and piston and the resultant displacement of the diaphragm can be varied.

10. A pipe cleaner as claimed in claim 2 including means to adjust the protuberance axially of the piston whereby the amount of compressive force stored in the compressible means may also be varied.

11. A pipe cleaner including a base having an opening therethrough, means for connecting one end of the opening to a pipe to be cleaned, a diaphragm sealing the opening internally, a piston engageable with the other end of the opening and having a protuberance on a part projecting away from the base, compressible means extending from the protuberance to the base, power means for imparting a series of blows at high frequency to the piston, and means for adjusting the protuberance axially of the piston whereby the cooperating relation of the piston and the compressible means may be varied to change the amount of compressive force stored in the compressible means.

GEORGE F. CLEMENT.

No references cited.